(12) United States Patent
Yoshizumi et al.

(10) Patent No.: US 7,112,311 B2
(45) Date of Patent: Sep. 26, 2006

(54) COOLING METHOD OF HYDROTREATING PLANT AND COOLING UNIT THEREFOR

(75) Inventors: Yuji Yoshizumi, Sendai (JP);
Hidekatsu Honda, Sendai (JP);
Masayuki Shoji, Sendai (JP);
Toshihiko Nasu, Sendai (JP);
Katsuhiko Kawakami, Tokyo (JP);
Junichi Takano, Tokyo (JP)

(73) Assignees: Nippon Petroleum Refining Co., Ltd., Tokyo (JP); Softard Industries Co., Ltd., Tokyo (JP)

( * ) Notice: Subject to any disclaimer, the term of this patent is extended or adjusted under 35 U.S.C. 154(b) by 939 days.

(21) Appl. No.: 09/984,967

(22) Filed: Oct. 31, 2001

(65) Prior Publication Data

US 2002/0106315 A1 Aug. 8, 2002

(30) Foreign Application Priority Data

Feb. 6, 2001 (JP) ............................. 2001-030074

(51) Int. Cl.
*B01J 8/00* (2006.01)
*C10G 45/00* (2006.01)
(52) U.S. Cl. ..................... 422/188; 422/198; 422/208; 208/113; 208/127; 208/129; 208/151; 208/153; 208/157; 208/164; 208/209; 208/213; 208/220; 208/390; 208/400; 208/424; 208/427; 208/434

(58) Field of Classification Search ............ 208/208 R, 208/209, 212, 213, 113, 127, 129, 151, 153, 208/157, 164, 220, 390, 400, 424, 427, 434; 422/188, 198, 208
See application file for complete search history.

(56) References Cited

U.S. PATENT DOCUMENTS 2,614,066 A * 10/1952 Cornell ........................ 208/212
3,720,602 A * 3/1973 Riley et al. ............. 208/216 R
3,725,252 A * 4/1973 Maier ......................... 208/213
4,071,439 A * 1/1978 Yanik et al. ............ 208/216 R
5,176,820 A * 1/1993 Lew ........................... 208/211

FOREIGN PATENT DOCUMENTS

| EP | 0938924 A1 * | 1/1999 |
| JP | 06-299168 A | 10/1994 |
| JP | 10-077484 A | 3/1998 |

* cited by examiner

*Primary Examiner*—Glenn Caldarola
*Assistant Examiner*—Prem C. Singh
(74) *Attorney, Agent, or Firm*—Lowe Hauptman & Berner, LLP (57) ABSTRACT

A cooling method of a hydrotreating plant having a desulfurization section (1) including a furnace (12) for heating liquid to be processed, reactors (14, 15) for hydrotreating sulfur to generate hydrogen sulfide, a hydrogen sulfide absorber (19) for absorbing the hydrogen sulfide generated in the reactors (14, 15), and a compressor (21) for compressing and transferring fluid from the hydrogen sulfide absorber (19) toward the reactors (14, 15), the cooling method comprising the steps of gradually depressurizing the hydrotreating plant at the desulfurization section (1) to a pressure level at which reactor material does not embrittle and gas does not leak due to difference of mechanical thermal expansion in the plant after stopping supply of the liquid to be processed, operating the compressor (21) approximately at the maximum rotation number, and completely extinguishing burners (12A, 12B) in the furnace (12) during plant shutdown operation.

12 Claims, 4 Drawing Sheets

COOLING METHOD OF HYDROTREATING PLANT AND COOLING UNIT THEREFOR

BACKGROUND OF THE INVENTION

1. Field of the Invention

The present invention relates to a cooling method of hydrotreating plant and a cooling unit therefor.

2. Description of Related Art

A general hydrotreating plant includes a desulfurization section having a reactor for generating hydrogen sulfide by hydrotreating sulfur and a hydrogen sulfide absorber for absorbing the hydrogen sulfide generated in the reactor, and a hydrogen sulfide absorbing section for circulating liquid for absorbing the hydrogen sulfide in the hydrogen sulfide absorber.

In the hydrotreating plant, the reactor should be rapidly cooled approximately from 400 to 40 degrees centigrade during plant shut down operation for the maintenance work such as catalyst replacement.

An air-cooling heat exchanger has been used as a cooling unit for cooling the hydrotreating plant. The air-cooling heat exchanger is provided on the downstream side of the reactor, and removes heat of a recycled gas circulated in a line of the air-cooling heat exchanger.

However, it takes five to seven days for the conventional method to cool the reactor of the hydrotreating plant from 400 to 40 degrees centigrade. Further, the term for cooling is influenced by an atmospheric temperature.

To solve the problem, some solutions have been developed such as a method in which the whole air-cooling heat exchanger is cooled by spraying water on the exchanger (improvement 1), a method in which a bypass is installed on the heat exchanger in the desulfurization section and a cooled recycled gas passing the bypass is directly introduced into the reactor (improvement 2), a method in which liquid nitrogen is supplied from the top of the reactor to lower the temperature of the recycled gas (improvement 3), a method in which liquid propane is supplied from the top of the reactor to lower the temperature of the recycled gas (improvement 4), a method in which a whole furnace is cooled by watering the top thereof (improvement 5), and a method in which circulating liquid is cooled by a special cooling unit provided on the hydrogen sulfide absorber and a circulating gas is cooled by the cooled circulating liquid passing through the hydrogen sulfide absorber, so that the whole reactor is cooled by the cooled circulating gas (improvement 6).

In the improvement 1, since the water spray damages a motor and a bearing of the air-cooling heat exchanger, a damage-preventing shield and a water-drop-preventing tub for the motor etc. are necessary. Further, a lot of water is necessary for adequately cooling the air-cooling heat exchanger.

In the improvement 2, high quality and thick pipes are required for the line, since the bypass is installed in the high-temperature and high-pressure desulfurization section, so that bypass installation cost is very expensive. Further, the bypass in itself doesn't bring enough cooling acceleration effect.

In the improvement 3, huge amount of liquid nitrogen is necessary for adequately cooling the plant, so that excessive running cost is needed.

In the improvement 4, it is necessary to purge out the evaporated propane gas to a flare by nitrogen gas after cooling.

In the improvement 5, since the inside of the furnace is heavily wetted with the water, it takes additional time for start up operation. Further, it is necessary to prevent the water from penetrating into a burner of the furnace. Furthermore, since the whole furnace is cooled by water, cooling efficiency is low and a lot of water is necessary for adequate cooling.

In the improvement 6, though more efficient cooling than the improvements 1 to 5 is possible, since special cooling unit is necessary, cost for preparing the unit and additional set-up work are necessary therefor.

SUMMARY OF THE INVENTION

An object of the present invention is to provide a cooling method of a hydrotreating plant and a cooling unit therefor for efficiently and rapidly cooling the hydrotreating plant without a special cooling device.

Conventionally, in order to prevent the reactor from damage by exposing the reactor to high pressure, the reactor exposed to high temperature in the hydrotreating, embrittled and weakened as a result, during plant shutdown operation, pressure has been kept under a predetermined value which is low as atmospheric pressure. However, as progress in the material used for the reactor, it is now possible to keep the pressure in the plant slightly higher.

Nevertheless, attempts to keep the pressure in the plant higher than the conventional method for rapidly cooling the hydrotreating plant have not yet been sufficiently investigated.

Accordingly, the present invention intends to achieve the object by keeping the pressure in the plant as high as possible in accordance with the temperature in the plant and by keeping large flow of fluid in the plant in suspending the hydrotreating plant.

The cooling method of the hydrotreating plant of the present invention is a cooling method of a hydrotreating plant having a desulfurization section including a furnace for heating liquid to be processed, a reactor for hydrotreating sulfur to generate hydrogen sulfide, a hydrogen sulfide absorber for absorbing the hydrogen sulfide generated in the reactor, and a compressor for compressing and transferring fluid from the hydrogen sulfide absorber toward the reactor, the cooling method rapidly cooling the inside of the reactor during shutdown operation, the cooling method comprising the steps of gradually depressurizing the hydrotreating plant at the desulfurization section to a pressure level at which reactor material does not embrittle and gas does not leak due to difference of mechanical thermal expansion in the system after stopping supply of the liquid to be processed, operating the compressor approximately at the maximum rotation number, and completely extinguishing a burner in the furnace.

The pressure during plant shutdown operation may preferably be higher to improve cooling efficiency. On the other hand, when the pressure is too high, an accident of the reactor may happen by embrittlement of the reactor material and the gas may leak by difference of mechanical thermal expansion. Accordingly, in view of a balance of the cooling efficiency, the embrittelement and the leak of the gas, the most appropriate pressure corresponding to the temperature in the system is determined. The specific pressure may preferably be 70% or more level of the pressure during operation.

According to the present invention, since the pressure in the plant is kept to a pressure level at which embrittelement of the reactor material and gas leak by difference of mechanical thermal expansion aren't generated and the compressor is driven approximately at the maximum rotation number, flow of the gas in the plant is kept more than a certain quantity and speed of the flow is kept approximately at the maximum. Further, since the burner in the furnace is completely extinguished in the state, comparatively low temperature fluid speedily flows in the plant, so that the inside of the reactor can be rapidly cooled.

In the above, a gas-releasing valve may preferably be provided on the desulfurization section to adjust the pressure in the plant by opening and closing the gas-releasing valve.

Since the gas-releasing valve is provided, the pressure in the plant can be easily adjusted.

An opening for the passage of air capable of adjusting opening size thereof and a fan for inducing or exhausting air may preferably be provided on the furnace, where the opening size of the opening for the passage of air may preferably be maximized after extinguishing the burner in the furnace and the fan may preferably be driven approximately at the maximum rotation number.

In the above, an air intake for introducing the air in the furnace or an air outlet for exhausting the air may be employed as the opening for the passage of air. When the air intake is employed, an exhaust fan provided on the exhaust side may be employed as the fan for inducing and exhausting the air. When the air outlet is employed, a forced draft fan provided on the air-supply side may be employed as the fan.

According to the present invention, the opening for the passage of air capable of adjusting opening size thereof and the fan for inducing or exhausting the air are provided on the furnace, while the opening size of the opening for the passage of air is maximized and the fan is driven approximately at the maximum rotation number.

Accordingly, the furnace with the highest temperature can be rapidly and efficiently cooled, so that the inside of the plant can be speedily cooled.

Further, at least one heat exchanger for exchanging heat between reactor effluent and reactor feed and an openable and closable bypass line for bypassing the heat exchanger may preferably be provided, while an openable and closable throttling valve may preferably be provided on the entrance of the heat exchanger, the bypass line being closed during normal operation, the bypass line being opened and the throttling valve being adjusted during plant shutdown operation.

Specifically, though the heat exchange of the fluid is positively carried out during normal operation to improve heat efficiency as efficient as possible, it is not necessary to re-heat the fluid cooled by the heat-exchange and the cooling efficiency is lowered by the heat-exchange during plant shutdown operation.

Therefore, in the present invention, the bypass line for bypassing the heat exchanger is provided to prevent the cooled fluid from being re-heated by the heat exchange, and the cooled fluid is circulated in the plant to improve the cooling efficiency in the plant.

Furthermore, a multi-stage catalyst bed may preferably be provided on the reactor while a line for flowing high temperature fluid which is heat-exchanged with fluid from the reactor to the hydrogen sulfide absorber and a line for flowing low temperature fluid which is not heat-exchanged may preferably be provided as a line for transferring fluid from the compressor toward the reactor, the line for low temperature fluid being connected to the multi-stage catalyst bed and the low temperature fluid being flowed into the multi-stage catalyst bed to cool the reactor.

Incidentally, it is not necessary that the line for low temperature fluid is connected to all the stages of the catalyst bed, but the stages for the low temperature fluid to be flowed may be selected in view of temperature in the plant during normal operation, pressure in the plant in cooling the plant etc.

Further, when the plant has a plurality of reactors, the line for low temperature fluid may preferably be also connected with a piping connecting the reactors. The cooling efficiency can be further improved by combining the line with the piping between the reactors to make the low temperature fluid flowed from the part.

According to the present invention, since the low temperature fluid that is not heat-exchanged by the heat exchanger is directly introduced into each stage of the catalyst bed, the reactor can be efficiently cooled than when the low temperature fluid is introduced only from the top of the reactor. Specifically, when the low temperature fluid is introduced only from the top of the reactor, temperature of the fluid is increased as flowing toward the bottom of the reactor, so that the cooling efficiency at the stage of the catalyst bed near the bottom of the reactor is significantly lowered. On the other hand, when the low temperature fluid is directly introduced into each stage of the catalyst bed, the reactor can be equally cooled, so that the cooling efficiency can be improved as a whole.

At least one air-cooling heat exchanger having an opening for the passage of air capable of adjusting opening size thereof may preferably be provided on the downstream side of the reactor, while all of the air-cooling heat exchangers may preferably be driven and the openings for the passage of air may preferably be fully opened simultaneously.

In the above, an air intake and an air outlet can be employed as the opening for the passage of air.

According to the present invention, at least one air-cooling heat exchanger is provided on the downstream side of the reactor, while all of the air-cooling heat exchangers are driven and the openings for the passage of air are fully opened simultaneously, so that the cooling efficiency in the plant can be further improved.

A bypass line for bypassing the hydrogen sulfide absorber may preferably be provided, while the bypass line may preferably be closed during normal operation and opened during plant shutdown operation.

According to the present invention, since the bypass line for bypassing the hydrogen sulfide absorber is provided, it is possible to prevent heat from transferring from the hydrogen sulfide absorber to the inside of the plant by opening the bypass line just after density of hydrogen sulfide in the circulated gas is lowered, so that the cooling efficiency can be improved.

A cooling unit of the hydrotreating plant according to the present invention is a cooling unit of the hydrotreating plant having a desulfurization section including a furnace for heating liquid to be processed, a reactor for hydrotreating sulfur to generate hydrogen sulfide, a hydrogen sulfide absorber for absorbing the hydrogen sulfide generated in the reactor, and a compressor for compressing and transferring fluid from the hydrogen sulfide absorber toward the reactor, the cooling unit rapidly cooling the reactor during plant shutdown operation, the cooling unit comprising a gas-releasing valve provided on the desulfurization section, an opening for the passage of air capable of adjusting opening size thereof and a fan for introducing or exhausting air provided on the furnace, at least one heat exchanger for exchanging heat between reactor effluent and reactor feed, an openable and closable bypass line for bypassing the heat exchanger, and a throttling valve provided on the entrance of the heat exchanger.

According to the present invention, since the gas-releasing valve is provided on the desulfurization section, pressure of the desulfurization section can be easily adjusted.

Further, since the opening for the passage of air capable of adjusting opening size thereof and the fan for inducing or forcing the air are provided on the furnace, the air can be flowed in the furnace during plant shutdown operation, so that the furnace with the highest temperature can be efficiently cooled.

Furthermore, since the bypass line for bypassing the heat exchanger is provided, it is possible to prevent cooled fluid from being re-heated on account of the heat exchange and the cooling efficiency in the plant can be improved by circulating the cooled fluid in the plant.

In the above, the reactor may preferably have a multi-stage catalyst bed and the cooling unit may preferably have a line for flowing high temperature fluid which is heat-exchanged with fluid from the reactor to the hydrogen sulfide absorber and a line for flowing low temperature fluid which is not heat-exchanged provided as a line for transferring fluid from the compressor toward the reactor, the line for low temperature fluid being connected to the multi-stage catalyst bed and to the reactor, at least one air-cooling heat exchanger having an opening for the passage of air capable of adjusting opening size thereof provided on the downstream side of the reactor, and a bypass line provided on the hydrogen sulfide absorber.

According to the present invention, since the line for low temperature fluid is provided and connected to the stages of the catalyst bed, the low temperature fluid that is not heat-exchanged by the heat exchanger is directly introduced into each stage of the catalyst bed in the reactor, so that the reactor can be efficiently cooled than an arrangement where the low temperature fluid is introduced only from the top of the reactor.

Further, since at least one air-cooling heat exchanger is provided on the downstream side of the reactor, the cooling efficiency in the plant can be further improved.

Furthermore, the bypass line is provided on the hydrogen sulfide absorber to restrain excessive heat from transferring into the plant, so that the cooling efficiency can be further improved.

DETAILED DESCRIPTION OF PREFERRED EMBODIMENT(S)

An embodiment of the present invention will be described below with reference to FIGS. 1 to 3.

(1) Structure of Hydrotreating Plant

Figure 1:
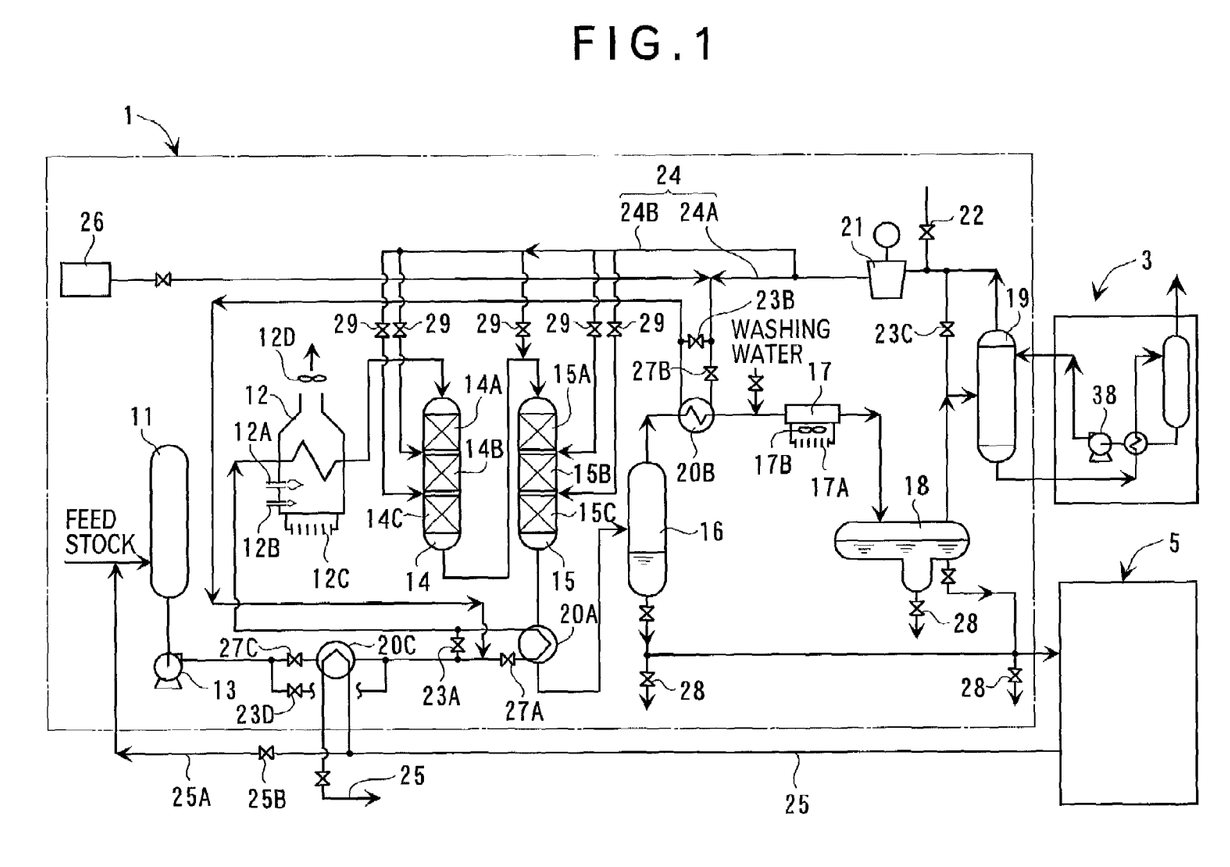
FIG. 1 is a general block diagram showing the hydrotreating plant (the desulfurization section) of an embodiment of the present invention.

A hydrotreating plant is a plant for hydrotreating and desulfurizing feedstock as processed liquid, and as shown in FIG. 1, the plant has a desulfurization section 1, a hydrogen sulfide absorbing section 3 and a distillation section 5.

The desulfurization section 1 has a surge tank 11, a furnace 12, a feedstock-transferring pump 13, a first reactor 14, a second reactor 15, a high temperature separator 16, an air-cooling heat exchanger 17, a low temperature separator 18, a hydrogen sulfide absorber 19, first to third heat exchangers 20A to 20C, a compressor 21, a gas-releasing valve 22 for adjusting and urgently decreasing pressure, first to fourth bypass lines 23A to 23D, a line 24 for sending liquid from the compressor 21 toward the reactors 14 and 15, a product line 25 for collecting desulfurized oil refined in the distillation section 5, a desulfurized-oil-return line 25A divided from the product line 25 opened and closed by a valve 25B for returning and circulating the fluid from the distillation section 5 to the surge tank 11 for predetermined time in starting and suspending the plant, a hydrogen make up unit 26 for supplying hydrogen to the system, throttling valves 27A to 27C provided on the upstream sides of the first to the third heat exchangers 20A to 20C, and a drain valve 28 for drawing the liquid of the system.

The surge tank 11 stores the feedstock as the processed liquid to be supplied into the hydrotreating plant. The feedstock is transferred from the surge tank 11 into the system by the feedstock-transferring pump 13.

The furnace 12 is a device for heating the supplied feedstock to the specific temperature and has a main burner 12A and a pilot burner 12B therein. An air intake 12C as an opening for the passage of air for adjusting airflow is provided on an intake side of the furnace 12, and an induced draft fan 12D for sucking and exhausting the air supplied into the furnace 12 is provided on the exhaust side of the furnace 12.

The first and the second reactors 14 and 15 are devices in which sulfur in the feedstock reacts with hydrogen by a catalyst stored in the reactors to generate hydrogen sulfide while the heated fluid flows from the top to the bottom of the reactors. The reactors 14 and 15 respectively have, for example, three-stage catalyst beds 14A to 14C and 15A to 15C therein, which respectively accelerate the desulfurizing process.

The high temperature separator 16 is a device in which the high temperature fluid transferred from the second reactor 15 separates into high temperature liquid (oil) and high temperature gas. The separated high temperature liquid is drained from the bottom of the high temperature separator 16 and transferred to the distillation section 5. On the other hand, the high temperature gas is exhausted from the top of the high temperature separator 16 and transferred to the air-cooling heat exchanger 17.

The air-cooling heat exchanger 17 cools the high temperature gas separated by the high temperature separator 16 by the air to condense the gas into low temperature liquid. A louver 17A (air path) capable of adjusting an opening area thereof and a fan 17B are provided on the top or the bottom of the air-cooling heat exchanger 17. Though not shown in the figures, a plurality of, for instance, eight air-cooling heat exchangers 17 are provided and some of them are actuated to cool the fluid during normal operation. Washing water for washing an extracted material in the fluid is supplied from the upstream side of the air-cooling heat exchanger 17 as necessary.

The low temperature separator 18 separates the low temperature liquid (oil) and the low temperature gas cooled by the air-cooling heat exchanger 17. The separated low temperature liquid is drained from the bottom of the low temperature separator 18, combined with the high temperature liquid and transferred to the distillation section 5. On the other hand, the low temperature gas is exhausted from the top of the low temperature separator 18 and transferred to the hydrogen sulfide absorber 19 described below.

The hydrogen sulfide absorber 19 absorbs hydrogen sulfide in the low temperature gas separated by the low temperature separator 18. Amine aqueous solution for absorbing the hydrogen sulfide flows in the absorber 19.

The first to the third heat exchangers 20A to 20C exchange heat between the high temperature fluid and the low temperature fluid during normal operation to improve heat efficiency in the plant.

Specifically, the first heat exchanger 20A exchanges heat between mixed fluid including the low temperature feedstock supplied from the surge tank 11 and recycled gas from the line 24 connected to an exhaust side of the compressor 21, and high temperature fluid flowed from the second reactor 15 in order to heat the feedstock and hydrogen. The second heat exchanger 20B exchanges heat between high temperature gas exhausted from the top of the high temperature separator 16 and low temperature (recycled) gas (low temperature fluid) passed through the hydrogen sulfide absorber 19 and the compressor 21 in order to heat the low temperature gas, so that the low temperature gas becomes high temperature fluid. The third heat exchanger exchanges heat between feedstock supplied from the surge tank 11 and desulfurized oil transferred from the distillation section 5 and flowed in the product line 25.

The compressor 21 compresses a part of gas passing through the hydrogen sulfide absorber 19 and transfers the gas to the furnace 12 and the reactors 14 and 15 through the line 24.

The line 24 is divided into a line 24A for high temperature fluid and a line 24B for low temperature fluid on the downstream side of the compressor 21. The line 24A for high temperature fluid is connected with a piping of the hydrogen supplied from the hydrogen make up unit 26, combined with a line for the feedstock from the surge tank 11 on the upstream side of the heat exchanger 20A after passing through the heat exchanger 20B, and transferred to the furnace 12 after passing though the heat exchanger 20A. On the other hand, the line 24B for low temperature fluid is divided into five lines. Four lines of the five lines are directly connected to intermediate parts between the catalyst beds, i.e. 14A to 14C and 15A to 15C, respectively via temperature control valves 29. On the other hand, the rest one line is indirectly connected to a pipe between the reactors 14 and 15.

The first to the fourth bypass lines 23A to 23D bypass the heat exchangers 20A to 20C and the hydrogen sulfide reactor 19, which are closed during normal operation and are opened during plant shutdown operation.

The first bypass line 23A bypasses the first heat exchanger 20A and has a valve capable being opened and closed. In cooling the plant, the valve is opened and the throttling valve 27A at the entrance of the first heat exchanger 20A is throttled, so that heat exchange at the first heat exchanger 20A between the fluid transferred from the second reactor 15 and the fluid flowed into the furnace 12 is lowered to approximately 30% level of normal operation, thereby, transferring the fluid lower than the fluid during normal operation toward the furnace 12.

The second bypass line 23B bypasses the second heat exchanger 20B and has a valve capable of being opened and closed as in the first bypass line 23A. In the same manner as the above, the valve 23B is opened during shutdown operation and the throttling valve 27B at the entrance of the second heat exchanger 20B is throttled, so that heat exchange at the second heat exchanger 20B between high temperature gas exhausted from the high temperature separator 16 and fluid compressed and transferred by the compressor 21 is lowered to approximately 40% level of normal operation. Accordingly, the low temperature gas (low temperature fluid) lower than fluid on normal operation, exhausted from the low temperature separator 18, is transferred toward the furnace 12.

The third bypass line 23C bypasses the hydrogen sulfide absorber 19 and has a valve capable of being opened and closed. In the same manner as the above, the valve 23C is opened during the plant suspension operation to lower heat exchange rate with the hydrogen sulfide absorbing section 3 as possible.

The fourth bypass line 23D bypasses the third heat exchanger 20C and has a valve capable of being opened and closed. In the same manner as the above, the valve 23D is opened during plant shutdown operation and the throttling valve 27C at the entrance of the third heat exchanger 20C is throttled, so that heat exchange at the third heat exchanger 20C between the feedstock supplied from the surge tank 11 and the comparatively high temperature desulfurized oil flowed in the product line 25 decreases to transfer the low fluid toward the furnace 12.

The throttling valves 27A to 27C may preferably not be completely closed but partially opened, since, if the heat exchangers 20A to 20C do not exchange heat at all, it is possible that the heat exchangers 20A to 20C is overheated at the beginning of the plant suspension operation. If there is no possibility of overheating, the throttling valves 27A to 27C may be completely closed.

The hydrogen sulfide absorbing section 3 is a well-known section in which the amine aqueous solution contacts with gas (recycled gas) from the low temperature separator 18 in the hydrogen sulfide absorber 19 in order to absorb hydrogen sulfide in the gas.

Figure 2:
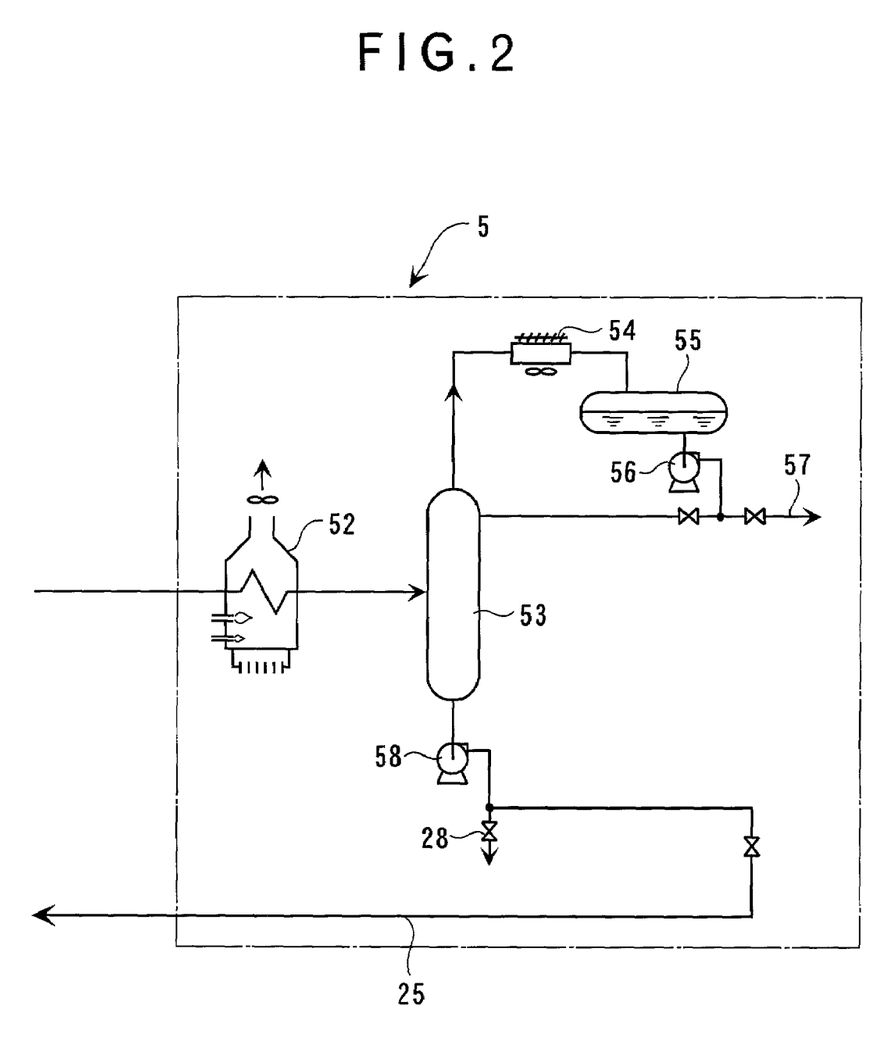
FIG. 2 is a general block diagram showing the distillation section of the embodiment in FIG. 1.

As shown in FIG. 2, the distillation section 5 has a furnace 52 for re-heating liquid separated by the high temperature separator 16 and the low temperature separator 18, a distillation tower 53 for distilling the heated liquid, an air-cooling heat exchanger 54 for condensing fluid exhausted from the top of the distillation tower 53 after distillation, a receiver 55 in which fluid cooled in the air-cooling heat exchanger 54 separates into gas and liquid, a pump 56 for transferring liquid separated in the receiver 55 to a product line 57, and a pump 58 for transferring fluid drained from the bottom of the distillation tower 53 after the distillation.

Fluid transferred from the pump 58 is transferred toward the desulfurization section 1 via the product line 25.

The furnace 52, the air-cooling heat exchanger 54 and the receiver 55 are the same as the furnace 12, the air-cooling heat exchanger 17 and the low temperature separator 18.

(2) Method for Desulfurizing Feedstock by Hydrotreating Plant

Operation for hydrotreating the feedstock by the hydrotreating plant constructed as the above will be described below.

First, the feedstock is supplied in the surge tank 11 for the plant operation and the hydrogen make up unit 26 is actuated.

The feedstock in the surge tank 11 is transferred to the furnace 12 via the third heat exchanger 20C and the first heat exchanger 20A by the feedstock-transferring pump 13. On the other hand, hydrogen is transferred to the furnace 12 by the hydrogen make up unit 26 via the second heat exchanger 20B and the first heat exchanger 20A in sequence as described. In other word, the feedstock and the hydrogen are combined on the entrance side of the first heat exchanger 20A.

The feedstock and the hydrogen are transferred to the first reactor 14 and the second reactor 15 after being heated in the furnace 12. In the reactors 14 and 15, sulfur in the feedstock reacts with the hydrogen to generate hydrogen sulfide.

High temperature fluid including the hydrogen sulfide and hydrogen that does not react in the reactors 14 and 15 is transferred to the high temperature separator 16 via the first heat exchanger 20A, and separated into high temperature liquid (oil) and high temperature gas in the high temperature separator 16. The separated high temperature gas is cooled in the air-cooling heat exchanger 17 after passing through the second heat exchanger 20B, which is transferred to the low temperature separator 18 and re-separated into low temperature liquid (oil) and low temperature gas by the low temperature separator 18.

The low temperature gas is transferred from the low temperature separator 18 to the hydrogen sulfide absorber 19. In the hydrogen sulfide absorber 19, the amine aqueous solution transferred from the hydrogen sulfide absorbing section 3 absorbs hydrogen sulfide in the low temperature gas. A part of the fluid including the hydrogen and the hydrogen sulfide that is not absorbed in the hydrogen sulfide absorber 19 is transferred to the furnace 12 by the compressor 21 through the line 24 for high temperature fluid after passing through the heat exchangers 20B and 20A in sequence as described.

On the other hand, if the temperature in the reactors 14 and 15 exceeds a predetermined value, the other part of the fluid is directly supplied to intermediate parts between the catalyst beds, i.e. 14A to 14C and 15A to 15C, via the line 24B for low temperature fluid after temperature control valves 29 are opened and is combined with the piping between the reactors 14 and 15, so that the temperatures in the reactors 14, 15 is lowered.

As described above, since the hydrogen is recycled and consumed in the desulfurization section 1, it is necessary that the hydrogen make up unit 26 suitably adjusts the supply of the hydrogen.

On the other hand, fluid composed of high temperature liquid separated in the high temperature separator 16 and low temperature liquid separated in the low temperature separator 18 is transferred to the distillation section 5 and collected as a product after being distilled in the distillation section 5. A part of the product is returned to the desulfurization section 1 via the desulfurized-oil-return line 25A for a predetermined time in starting and suspending the plant.

Specifically, as shown in FIG. 2, fluid from the desulfurization section 1 is introduced to the distillation section 5 and after being heated in the furnace 52, supplied into the distillation tower 53. A part of fluid distilled and refined in the distillation tower 53 is exhausted from the top of the distillation tower 53 to pass the heat exchanger 54, and subsequently, is separated into gas and liquid in the receiver 55. The separated liquid is collected as product from the product line 57.

A part of the product is refluxed to the distillation tower 53 by the pump 56. On the other hand, fluid drained from the bottom of the distillation tower 53 is transferred to the product line 25 by the pump 58. Fluid passed through the product line 25 is transferred to the desulfurization section 1 and collected as product through the third heat exchanger 20C during normal operation (see FIG. 1).

[3] Cooling Method for Hydrotreating Plant

Next, a cooling method for the plant during plant shutdown operation after the hydrotreating explained in aforesaid [2] will be described below.

(1) Rotating speed of the compressor 21 is maximized and flow of the circulated gas is increased after cutting the supply of the new feedstock into the plant.

Figure 3A:
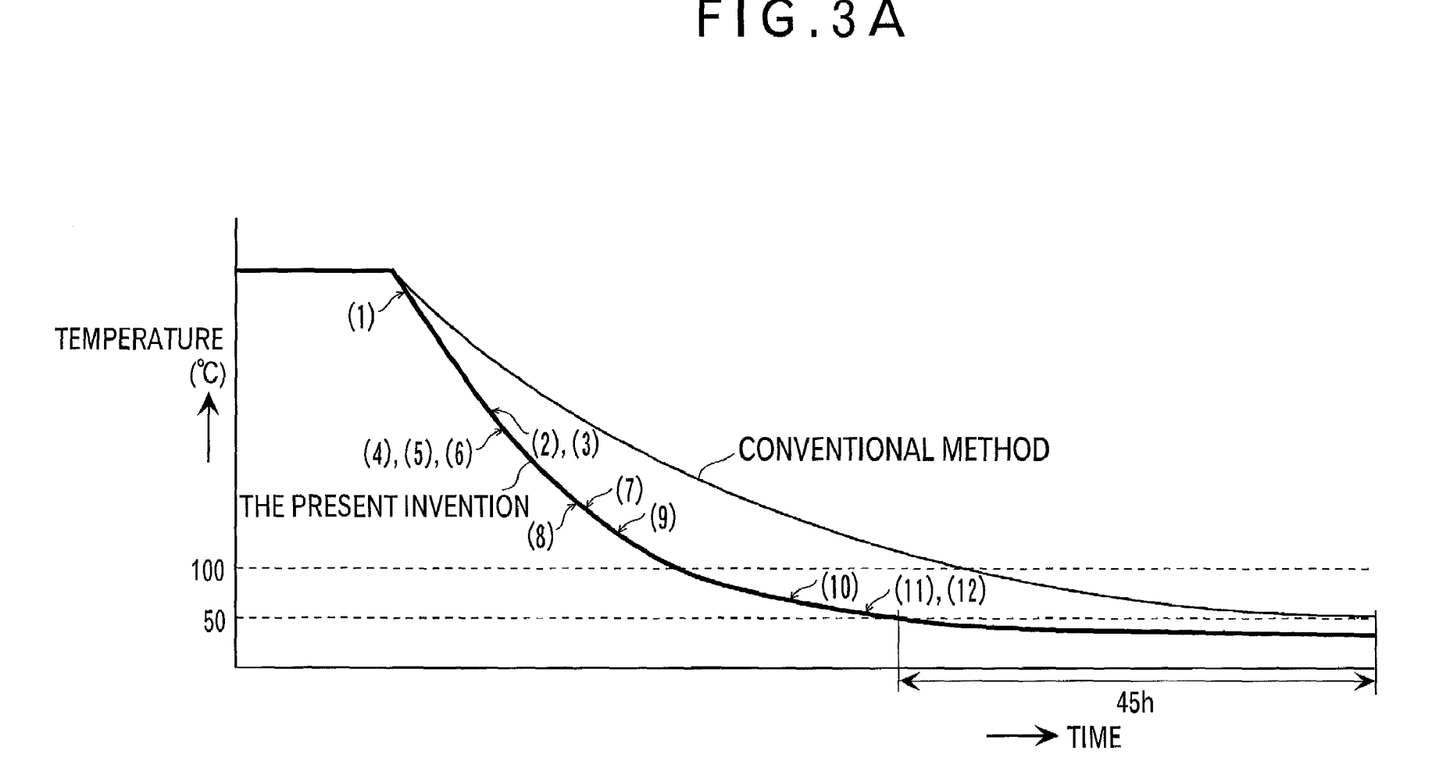
FIG. 3 is a graph comparing the cooling time and the pressure of the cooling method in the plant of the present invention with the conventional method.
Figure 3B:
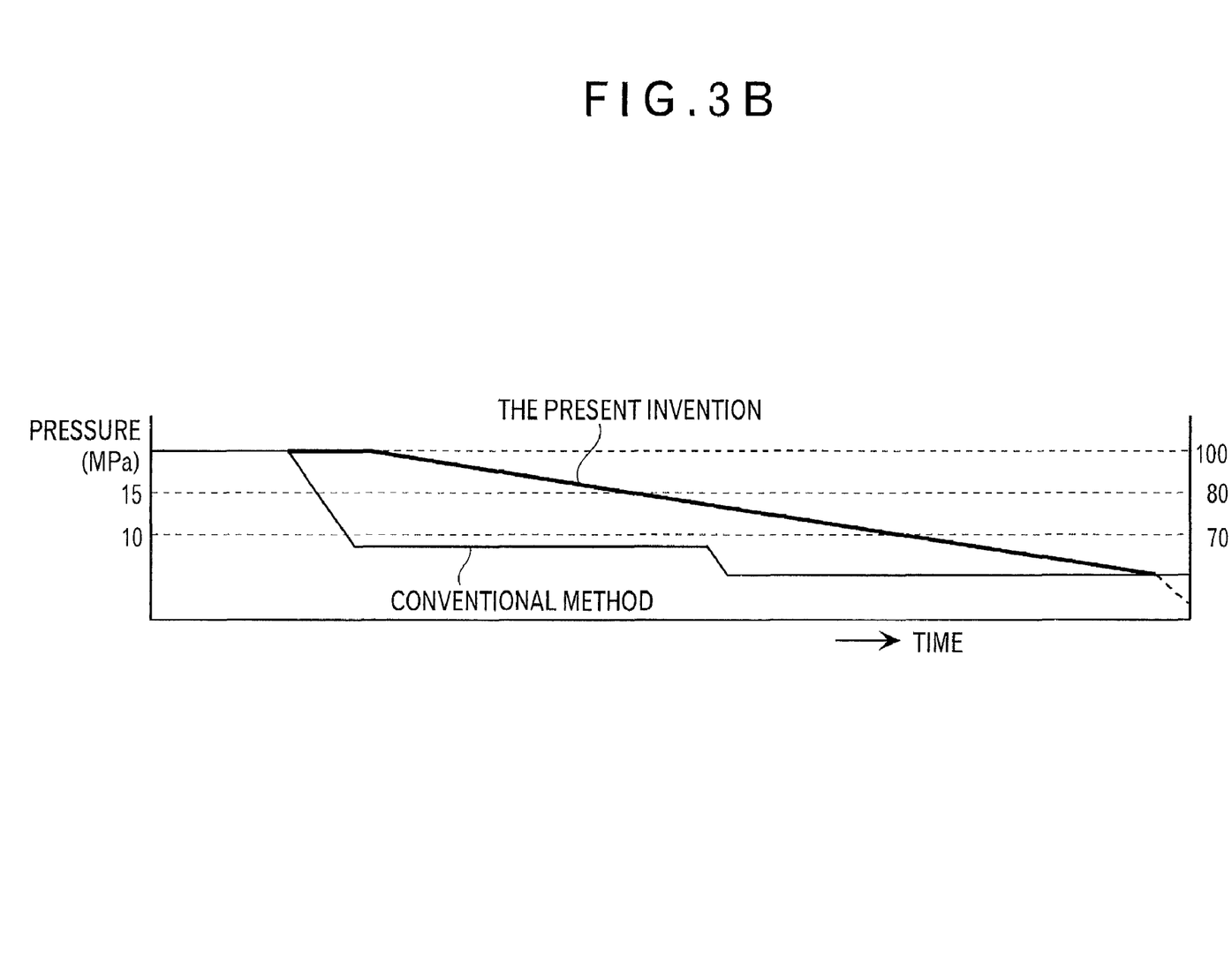

(2) Pressure in the plant is gradually decreased by adjusting the gas-releasing valve 22 to a predetermined value, in which material of the reactors will not embrittle and the gas will not leak on account of difference between mechanical thermal expansions in the plant, i.e. approximately 70% level of pressure during the hydrotreating (Pressure during normal operation: approximately 18.8 MPa, Pressure after the adjustment: approximately 13 MPa) (see FIG. 3(B)). Temperature in the plant at this point is approximately from 300 to 350 degrees centigrade.

FIG. 3(B) is a graph indicating pressure in the plant in the vertical axis and time in the horizontal axis, representing time series of the pressure and showing the pressure according to the present invention is kept higher than the pressure in the conventional method.

(3) The main burner 12A and the pilot burner 12B in the furnace 12 are completely extinguished.

(4) The air intake 12C in the furnace 12 is fully opened and the rotating number of the induced draft fan 12D is maximized to maximize flow of the air in the furnace 12, so that the inside of the furnace 12 can be positively cooled.

(5) The fourth bypass line 23D of the third heat exchanger 20C is fully opened and the throttling valve 27C on the side in which the fluid flows into the third heat exchanger 20C is throttled to reduce the heat exchange and to lower temperature of the fluid.

(6) The first bypass line 23A of the first heat exchanger 20A is fully opened and the throttling valve 27A on the side in which the fluid flows into the first heat exchanger 20A is throttled to 30% level of flow during the hydrotreating to reduce the heat exchange and to lower temperature of the fluid.

(7) The maximum quantity of the low temperature fluid is flowed into intermediate parts between the catalyst beds 14A to 14C and 15A to 15C in the first reactor 14 and the second reactor 15 respectively.

(8) The second bypass line 23B of the second heat exchanger 20B is fully opened and the throttling valve 27B on the side in which the fluid flows from the compressor 21 into the heat exchanger 20B is throttled to 40% level of flow during the hydrotreating to reduce the heat exchange and to lower temperature of the fluid.

(9) All the air-cooling heat exchangers 17 provided on the downstream side of the second heat exchanger 20B are running, while the air intakes 17A are fully opened and the rotating number of the fans 17B is maximized to maximize cooling efficiency of the fluid.

(10) After gradually decreasing pressure in the plant for about 24 hours, the gas-releasing valve 22 is opened to further decrease the pressure to approximately 70% level of pressure during the hydrotreating (about 13 MPa) (see FIG. 3(B)).

Temperature in the plant at this point is approximately from 150 to 200 degrees centigrade.

(11) The third bypass line 23C is fully opened to restrict flow of the low temperature gas into the hydrogen sulfide absorber 19.

(12) After temperature of the amine aqueous solution in the hydrogen sulfide absorbing section 3 is lowered, the high-pressure amine solution pump 38 in the hydrogen sulfide absorbing section 3 is stopped.

The procedure (1) to (12) can be replaced with each other as long as the plant can be cooled. Further, the numbers in (1) to (12) correspond to the numbers in FIG. 3 (A).

Incidentally, during the above operation, the liquid remaining in the plant circulates until the temperature in the plant is not more than a predetermined value (ex. not more than 100 degrees centigrade), and subsequently, the liquid is drained from the drain valves 28 (see FIGS. 1 and 2).

[4] Effects of the Embodiment

According to the embodiment described above, the following effects can be obtained.

(1) Since the pressure in the plant is maintained not less than 70% level of pressure during normal operation and the compressor 21 is driven at the maximum, flow of the gas in the system is kept not less than specific quantity and speed of the flow is kept to be approximately maximum. Further, since the burners 12A and 12B of the furnace 12 are completely extinguished in the above state, comparatively lower temperature fluid speedily flows in the plant, so that the reactors 14 and 15 can rapidly be cooled.

Specifically, as shown in FIG. 3(A) indicating temperature in the reactors in the vertical axis and cooling time in the horizontal axis, cooling time of the present invention is much shorter than that of the conventional method. Particularly, the cooling speed of the present invention under 100 degrees centigrade, in which cooling driving force is small, is clearly different from that of the conventional method, and necessary time of the present invention for finally reaching to 50 degrees centigrade is shorter than that of the conventional method by about 45 hours.

(2) Cooling efficiency in initial step with higher temperature in the reactors 14 and 15 can be increased by gradually decreasing the pressure in the plant to approximately 70% level of pressure during normal operation and keeping the level.

(3) The air intake 12C capable of adjusting opening size thereof is provided on the intake side of the furnace 12, and the induced draft fan 12D is provided on the exhaust side of the furnace 12, where the opening size of the air intake 12C is maximized, and the rotating number of the induced draft fan 12D is maximized. Accordingly, the maximum amount of air can be supplied into the furnace 12, which is in the highest temperature in the plant, to rapidly and efficiently cool the furnace 12, so that the inside of the plant can be rapidly cooled.

(4) Since the first, the second and the fourth bypass lines 23A, 23B and 23D bypassing the heat exchangers 20A to 20C are provided, the cooled fluid is prevented from being re-heated on account of the heat-exchange. Further, the cooled fluid is circulated in the plant, so that the cooling efficiency of the plant can be improved.

(5) Since the low temperature fluid that is not heat-exchanged by the second heat exchanger 20B is directly introduced into the intermediate parts between the catalyst beds 14A to 14C and 15A to 15C of the reactors 14 and 15 respectively, the reactors 14 and 15 can be cooled more efficiently than an arrangement in which the low temperature fluid is only indirectly introduced from the top of the reactors. Specifically, in the arrangement in which the low temperature fluid is introduced only from the top of the reactors, temperature of the fluid increases as the fluid flows to the bottom of the reactors, so that cooling efficiency of the catalyst beds near the bottom is significantly decreased. On the other hand, in the present invention, the reactors 14 and 15 can be equally cooled by directly introducing the low temperature fluid into the intermediate parts between the catalyst beds 14A to 14C and 15A to 15C, so that the cooling efficiency as a whole can be improved. In addition, the low temperature fluid that is not heat-exchanged by the second beat exchanger 20B is directly introduced to the top of the reactor 15, so that adjustment of cooling speed of the reactor 15 can be facilitated.

(6) Since a plurality of the air-cooling heat exchangers 17 are provided on the downstream side of the second reactor 15 and all of the air-cooling heat exchangers 17 are in service, while fully opening the air intakes 17A and driving the fans 17B at the maximum rotation number, the cooling efficiency in the plant can be further improved.

(7) Since the gas-releasing valve 22 is provided, the pressure in the plant can easily be adjusted.

[5] Modifications

Incidentally, the scope of the present invention is not restricted to the above embodiment, but includes modifications and improvements as long as an object of the present invention can be achieved. For example, in the embodiment, the pressure in the plant in cooling is approximately 70% level of pressure of normal operation. However, the pressure is not restricted. Specifically, the pressure can be optional as long as the material composing the reactors will not embrittle and the gas will not leak by mechanical thermal difference in the plant, which can be adjusted in view of the material of the reactors and the temperature in the plant during the hydrotreating.

In the embodiment, though the throttling valve 27A on the entrance side of the first heat exchanger 20A is throttled to 30% level of opening during the hydrotreating and the throttling valve 27B on an entrance side of the second heat exchanger 20B is throttled to 40% level of opening during the hydrotreating, such arrangement is not limiting, but the throttling valves can be adjusted in accordance with the temperature of the plant during normal operation, the pressure in the system in cooling and the gas leak by mechanical thermal difference etc.

The low temperature fluid may only be introduced into selected catalyst beds in the first and the second reactors 14 and 15.

In the embodiment, though the first and the second reactors 14 and 15 are used, the number of reactors is not restricted, but one or more than two reactors may be used. Further, the number of the other devices may be increased and decreased in accordance with the number of the reactors.

Power output of the compressor 21, the rotating number of the induced draft fan 12D in the furnace 12, the rotating number of the fans 17B of the air-cooling heat exchangers 17 can be adjusted in accordance with the temperature in the plant during normal operation and the pressure in the plant in cooling.

The opening size of the air intake 12C in the furnace 12 and the opening size of the air intakes 17A in the air-cooling heat exchangers 17 may be adjusted in accordance with the temperature in the plant during normal operation and the pressure in the plant in cooling.

The hydrotreating plant is not restricted to a hydrodesulfurizing plant but may be a hydrocracking plant.

The other structures and arrangements to implement the present invention may be used as long as an object of the present invention can be achieved.

What is claimed is:

1. A cooling unit of a hydrotreating plant having a desulfurization section including a furnace for heating liquid to be processed, a reactor for hydrotreating sulfur to generate hydrogen sulfide, a hydrogen sulfide absorber for absorbing the hydrogen sulfide generated in the reactor, and a compressor for compressing and transferring fluid from the hydrogen sulfide absorber toward the reactor, the cooling unit rapidly cooling the reactor during shutdown operation, the cooling unit comprising:
　a gas-releasing valve provided on the desulfurization section;
　an opening for the passage of air and a fan both provided on the furnace, the opening for the passage of air capable of adjusting opening size thereof and the fan introducing and exhausting the air;
　at least one heat exchanger for exchanging heat between fluid on the downstream side of the reactor and fluid supplied to the upstream side of the furnace;
　an openable and closable bypass line for bypassing the heat exchanger; and
　a throttling valve provided on the entrance of the heat exchanger.

2. The cooling unit of the hydrotreating plant according to claim 1, the reactor comprising a multi-stage catalyst bed, the cooling unit comprising:
　a line for flowing high temperature fluid which is heat-exchanged with fluid from the reactor to the hydrogen sulfide absorber and a line for flowing low temperature fluid which is not heat-exchanged, provided as a line for transferring fluid from the compressor toward the reactor, the line for the low temperature fluid being connected to the multi-stage catalyst bed and to the reactor;
　at least one air-cooling heat exchanger having an opening for the passage of air capable of adjusting opening size thereof provided on the downstream side of the reactor; and
　a bypass line provided on the hydrogen sulfide absorber.

3. A method of cooling a hydrotreating plant during shutdown operation, the hydrotreating plant having a desulfurization section including a furnace having at least one burner for heating a liquid to be processed, a reactor for hydrotreating sulfur to generate hydrogen sulfide, a hydrogen sulfide absorber for absorbing the hydrogen sulfide generated in the reactor, and a compressor for compressing and transferring a fluid from the hydrogen sulfide absorber toward the reactor, the method comprising the steps of:
　after stopping supply of the liquid to be processed, depressurizing the hydrotreating plant at the desulfurization section to a pressure level at which reactor material does not embrittle and gas does not leak due to difference of mechanical thermal expansion values in the plant;
　operating the compressor approximately at the maximum rotational speed thereof; and
　completely extinguishing said burner in the furnace; wherein
　the furnace further comprises an air inlet having an adjustable opening and a fan for introducing air into or exhausting air from the furnace; and
　said method further comprises, after the step of completely extinguishing the burner in the furnace, maximizing a size of the opening of the air inlet and driving the fan approximately at the maximum rotational speed thereof.

4. The method of claim 3, wherein the desulfurization section further has a gas-releasing valve;
　said method further comprising adjusting the pressure in the plant by opening and closing the gas-releasing valve.

5. The method of claim 3, wherein the desulfurization section further has
　at least one heat exchanger for exchanging heat between effluent and feed of the reactor;
　an openable and closable bypass line for bypassing the heat exchanger; and
　an openable and closable throttling valve provided in said bypass line and at the entrance of the heat exchanger, the bypass line being closed by said throttling valve during normal operation;
　said method further comprising opening the bypass line and adjusting the throttling valve during the shutdown operation.

6. The method of claim 3, wherein the desulfurization section further has
　a multi-stage catalyst bed in the reactor;
　a first line along which high temperature fluid that is heat-exchanged with fluid from the reactor flows to the hydrogen sulfide absorber; and
　a second line along which low temperature fluid that is not heat-exchanged flows from the compressor toward the reactor, the second line being connected to the multi-stage catalyst bed;
　said method further comprising allowing the low temperature fluid to flow along said second line into the multi-stage catalyst bed to cool the reactor.

7. The method of claim 3, wherein the desulfurization section further has multiple air-cooling heat exchangers positioned downstream of the reactor, each of said air-cooling heat exchangers comprising an adjustable air opening;
　said method further comprising driving all of said air-cooling heat exchangers and fully opening the air openings of said air-cooling heat exchangers simultaneously.

8. The method of claim 3, wherein the desulfurization section further has a bypass line for bypassing the hydrogen sulfide absorber, the bypass line being closed during normal operation;
　said method further comprising opening the bypass line during the shutdown operation.

9. A method of cooling a hydrotreating plant during shutdown operation, the hydrotreating plant having a desulfurization section including a furnace having at least one burner for heating a liquid to be processed, a reactor for hydrotreating sulfur to generate hydrogen sulfide, a hydrogen sulfide absorber for absorbing the hydrogen sulfide generated in the reactor, and a compressor for compressing and transferring a fluid from the hydrogen sulfide absorber toward the reactor, the method comprising the steps of:
　after stopping supply of the liquid to be processed, depressurizing the hydrotreating plant at the desulfurization section to a pressure level at which reactor material does not embrittle and gas does not leak due to difference of mechanical thermal expansion values in the plant;
　operating the compressor approximately at the maximum rotational speed thereof; and
　completely extinguishing said at least one burner in the furnace;
　wherein
　the desulfurization section further has multiple air-cooling heat exchangers positioned downstream of the reactor, each of said air-cooling heat exchangers comprising an adjustable air opening; and said method further comprises driving all of said air-cooling heat exchangers and fully opening the air openings of said air-cooling heat exchangers simultaneously.

10. The method of claim 9, wherein the desulfurization section further has at least one heat exchanger for exchanging heat between effluent and feed of the reactor;

an openable and closable bypass line for bypassing the heat exchanger; and an openable and closable throttling valve provided in said bypass line and at the entrance of the heat exchanger, the bypass line being closed by said throttling valve during normal operation;

said method further comprising opening the bypass line and adjusting the throttling valve during the shutdown operation.

11. The method of claim 9, wherein the desulfurization section further has a multi-stage catalyst bed in the reactor;

a first line along which high temperature fluid that is heat-exchanged with fluid from the reactor flows to the hydrogen sulfide absorber; and a second line along which low temperature fluid that is not heat-exchanged flows from the compressor toward the reactor, the second line being connected to the multi-stage catalyst bed;

said method further comprising allowing the low temperature fluid to flow along said second line into the multi-stage catalyst bed to cool the reactor.

12. The method of claim 9, wherein the desulfurization section further has a bypass line for bypassing the hydrogen sulfide absorber, the bypass line being closed during normal operation;

said method further comprising opening the bypass line during the shutdown operation.

* * * * *